(12) United States Patent
Lin et al.

(10) Patent No.: US 11,787,056 B2
(45) Date of Patent: Oct. 17, 2023

(54) ROBOT ARM OBSTACLE AVOIDANCE METHOD AND ROBOT ARM OBSTACLE AVOIDANCE SYSTEM

(71) Applicant: Cheng Uei Precision Industry Co., Ltd., New Taipei (TW)

(72) Inventors: Po Ting Lin, New Taipei (TW); Chao Yi Lin, New Taipei (TW); Shih Wei Lin, New Taipei (TW); Kun Cheng Li, New Taipei (TW); Chang Yun Yang, New Taipei (TW); Pei Fen Wu, New Taipei (TW); Shun Chien Lan, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 233 days.

(21) Appl. No.: 17/474,289

(22) Filed: Sep. 14, 2021

(65) Prior Publication Data

US 2023/0061855 A1    Mar. 2, 2023

(30) Foreign Application Priority Data

Aug. 26, 2021    (CN) .......................... 202110990348.X

(51) Int. Cl.
*B25J 9/16* (2006.01)
*B25J 9/04* (2006.01)

(52) U.S. Cl.
CPC .............. *B25J 9/1666* (2013.01); *B25J 9/042* (2013.01); *B25J 9/1676* (2013.01)

(58) Field of Classification Search
CPC ........ B25J 9/1666; B25J 9/042; B25J 9/1676; G05B 2219/39082; G05B 2219/40317
See application file for complete search history.

(56) References Cited

U.S. PATENT DOCUMENTS

| 11,279,033 | B2* | 3/2022 | Graichen | ............... B25J 9/1666 |
| 2006/0241827 | A1* | 10/2006 | Fukuchi | ............... G05D 1/0274 |
| | | | | 701/23 |
| 2017/0348856 | A1* | 12/2017 | Nakaya | ................. B25J 9/1666 |
| 2019/0337154 | A1* | 11/2019 | Holson | .................. B25J 9/1666 |

* cited by examiner

*Primary Examiner* — Khoi H Tran
*Assistant Examiner* — Nhi Q Bui
(74) *Attorney, Agent, or Firm* — LIN & ASSOCIATES INTELLECTUAL PROPERTY, INC.

(57) ABSTRACT

An obstacle avoidance method for a robot arm is provided, including a modeling step, a collecting and evaluating coordinates step, an obtaining control parameter step, an establishing an occupation function step, and a finding an obstacle avoiding posture step. The present invention pre-stores the data obtained in performing the modeling step, the step of collecting and evaluating coordinates, the step of obtaining control parameter, and the step of establishing occupation function into a database, thereby allowing the robot arm to quickly evaluate whether a collision behavior will occur in subsequent execution of a task. If a collision will occur, the robot arm executes the step of the finding the obstacle avoiding posture to dodge obstacles. The invention uses a non-contact approach for anti-collision design, which can improve the shortcomings faced by the existing contact type anti-collision design.

10 Claims, 9 Drawing Sheets

ROBOT ARM OBSTACLE AVOIDANCE METHOD AND ROBOT ARM OBSTACLE AVOIDANCE SYSTEM

BACKGROUND OF THE INVENTION

1. Field of the Invention

The present invention relates generally to the technical field of automation equipment, and more particularly, to a non-contact obstacle avoidance method for a robot arm, and a robot arm obstacle avoidance system based on the robot arm obstacle avoidance method.

2. The Prior Arts

With the rapid development of industrial technology, automation technology has been widely used in various industries, for example, applying robot arms or other similar equipment to assist production in order to improve the production efficiency of the factory. However, during the operation of the robot arm, there may be people or other obstacles within its working range. At present, to avoid damage to the robot arm due to collision, common anti-collision safety technologies generally include the following two approaches:

The first approach is to use the limiting relationship between resistance and operating current to achieve the protection. The principle is that when the robot arm collides with an obstacle, it will encounter resistance and increase the current of the motor used to control the robot arm, and thereby the operating current can be used to set the robot arm to stop when exceeding the limit.

The second approach is to use smart skin to achieve the protection. The principle is to cover the surface of the robot arm with pressure sensors. When the robot arm collides with an obstacle, the pressure sensor will send a signal to control the robot arm to stop operating. However, this approach requires covering the robot arm with as many sensors as possible, so in addition to the disadvantage of increasing the overall weight of the robot arm, the cost will also be increased and the sensor deployment process is also complicated.

Since the above two approaches are both contact-type, that is, physical contact with an obstacle must occur before triggering the stop-operation of the robot arm. Therefore, when the robot arm collides with a person or an obstacle, the person is often already injured, or the product is damaged and/or the robot arm is damaged. In addition, the existing robot arm only designs the anti-collision effect for end effector, instead of taking the entirety of the robot arm into account, so the anti-collision effect is often limited.

SUMMARY OF THE INVENTION

A primary objective of the present invention is to provide a non-contact obstacle avoidance method for robot arm to achieve an overall collision avoidance effect.

Therefore, the obstacle avoidance method for robot arm of the present invention is applicable to a robot arm with a plurality of joints and a plurality of connecting arms respectively connected to different joints. The robot arm obstacle avoidance method of the present invention includes a modeling step, a collecting and evaluating coordinates step, an establishing an occupancy function step, a obtaining control parameter, and a finding an obstacle avoiding posture.

The modeling step is to construct the connecting arms into a cylinder with a fixed diameter, and the diameter of the cylinder is not less than the diameter of the thickest connecting arm.

The collecting evaluation coordinates step is to collect the k-th sampling point of the modeled robot arm in the i-th working posture within a working range, and mark the evaluation coordinates corresponding to the sampling point as $Q_k^i$, both i and k are positive integers.

The establishing an occupancy function step is to establish an occupancy function O that is used to determine whether the m-th spatial coordinate is part of the occupancy function O occupied by the robot arm, m is a positive integer. When the distance between the m-th spatial coordinate and the evaluation coordinate to be compared is less than a set value, the function value range of the occupation function O corresponding to occupied state is defined to be greater than 0.5 and less than 1, and the function value range of the occupation function O corresponding to non-occupied state is defined to be 0 to 0.5.

The obtaining control parameter step is to obtain the control parameter $X^i$ corresponding to the i-th working posture of the robot arm on the movement path.

The finding an obstacle avoidance posture is based on the following equation:

$$\text{Min}(X_{new}^i - X^i)^2 \text{ s.t. } O(X_{new}^i) \leq O_T,$$

to obtain an obstacle avoidance posture, where $X_{new}^i$ is the control parameter corresponding to the obstacle avoidance posture, and $O_T$ is a threshold.

Another objective of the present invention is to provide a robot arm obstacle avoidance system based on the above-mentioned robot arm obstacle avoidance method.

Therefore, the robot arm obstacle avoidance system of the present invention includes a robot arm and a host. The robot arm is fixed on a base and includes a plurality of joints and a plurality of connecting arms respectively connected to different joints. The host is electrically connected to the robot arm and includes a database and a computation control module. The database stores the data obtained in the aforementioned modeling step, the collecting and evaluating coordinates step, the obtaining control parameter step, and the establishing an occupancy function step. The computation control module is electrically connected to the database, and is used to execute the aforementioned finding an obstacle avoidance posture step to control the robot arm to avoid over obstacles.

The effect of the present invention includes at least the following: by pre-storing the posture parameters in the database that the robot arm may use in the execution of the task, the robot arm can quickly evaluate whether a behavior will cause obstacle collision when the robot arm performs the subsequent task; and if so, the finding an obstacle posture step is executed to avoid the obstacle. The invention not only enables the robot arm to achieve the overall obstacle avoidance anti-collision effect, but also improve the shortcomings faced by the existing contact anti-collision design because of the non-contact anti-collision design.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
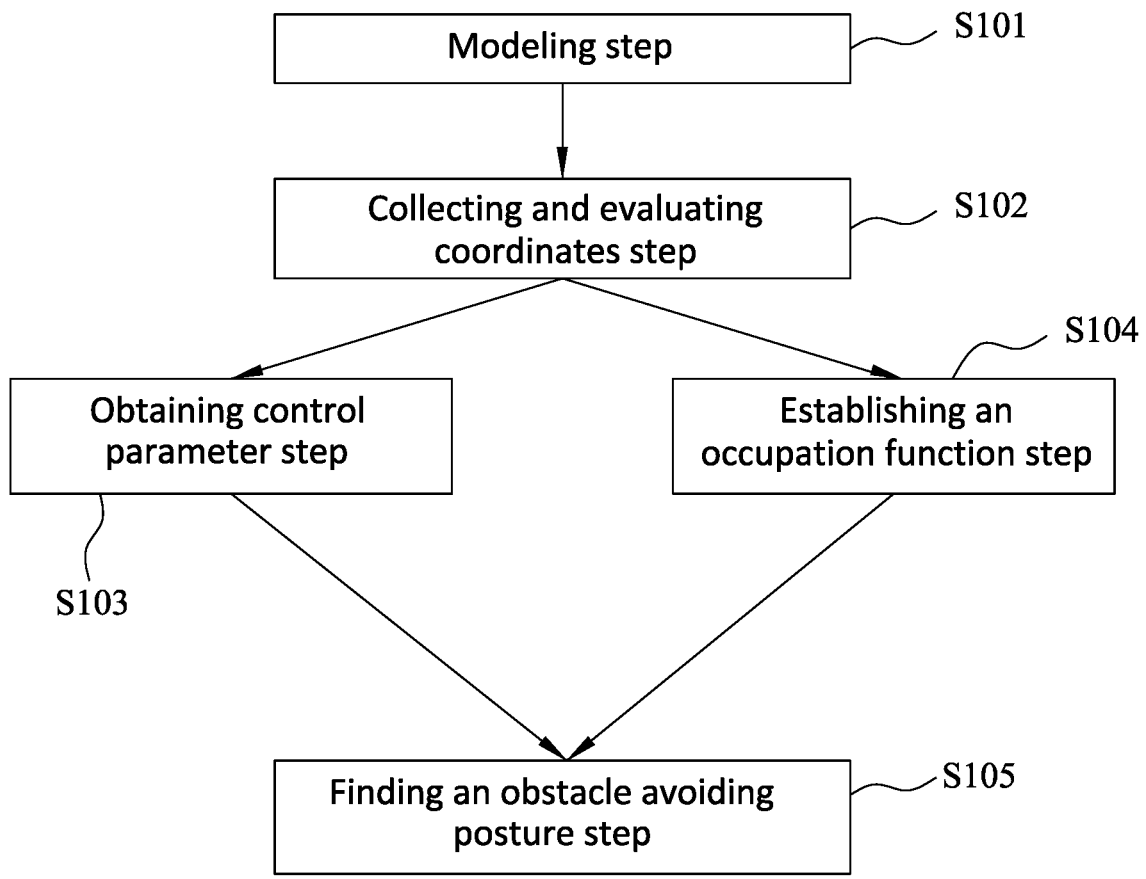
FIG. 1 is a flow chart of the robot arm obstacle avoidance method of the present invention.

The accompanying drawings are included to provide a further understanding of the invention, and are incorporated in and constitute a part of this specification. The drawings illustrate embodiments of the invention and, together with the description, serve to explain the principles of the invention.

It should be noted that in the following description, similar elements are represented by the same numbers. In addition, the relevant parameters such as the shape, size, thickness, and angle of the elements are not drawn according to scale in the drawings, and its simplified intention is only for convenience and clarity.

Figure 2:
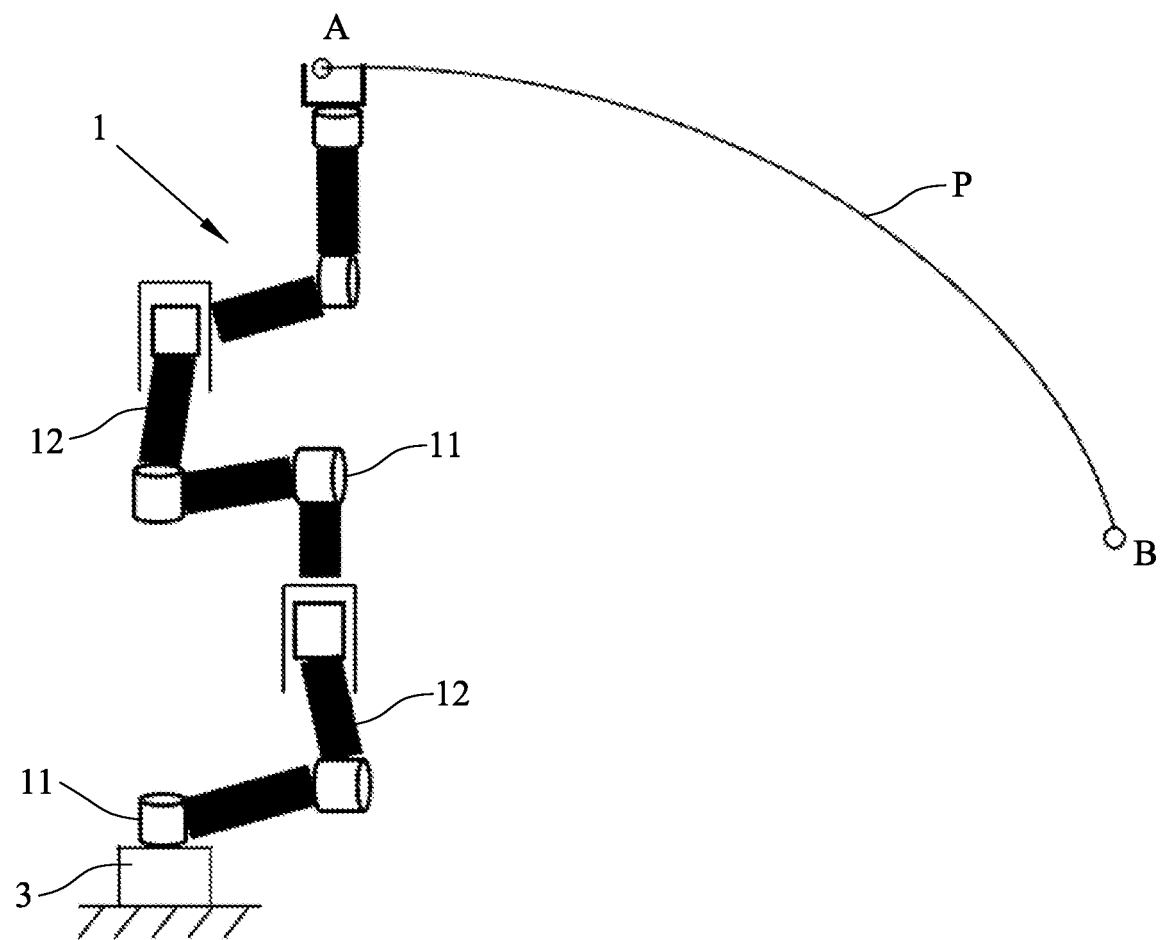
FIG. 2 is a schematic view of an embodiment of the robot arm obstacle avoidance system of the present invention.
Figure 3:
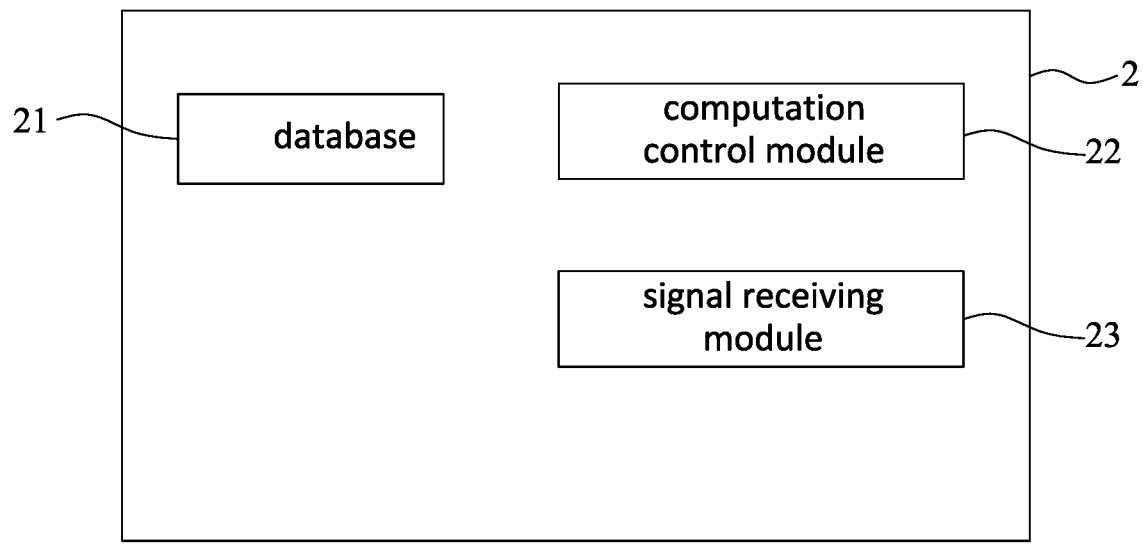
FIG. 3 is a block diagram of a host of the robot arm obstacle avoidance system of the present invention.

Referring to FIGS. 1, 2, and 3, the robot arm obstacle avoidance method of the present invention is applicable for the robot arm obstacle avoidance system. The robot arm obstacle avoidance system includes a robot arm 1 with a high degree of freedom, and a host computer 2 electrically connected to the robot arm 1. In this embodiment, the robot arm 1 is fixed to a base 3, and the robot arm 1 includes a plurality of joints 11 and a plurality of connecting arms 12 respectively connecting to different joints 11. The host 2 includes a database 21, a computation control module 22, and a signal receiving module 23 that are mutually electrically connected. The computation control module 22 includes a processor, and the signal receiving module 23 includes a receiver and an emitter. In actual applications, the host 2 can be a robot controller, server, desktop computer or laptop, and so on. The electrical connection between the host 2 and the robot arm 1 is not limited to wirelessly transmitting signals through the signal receiving module 23, and may also be transmitting signals through wired means.

Figure 8:
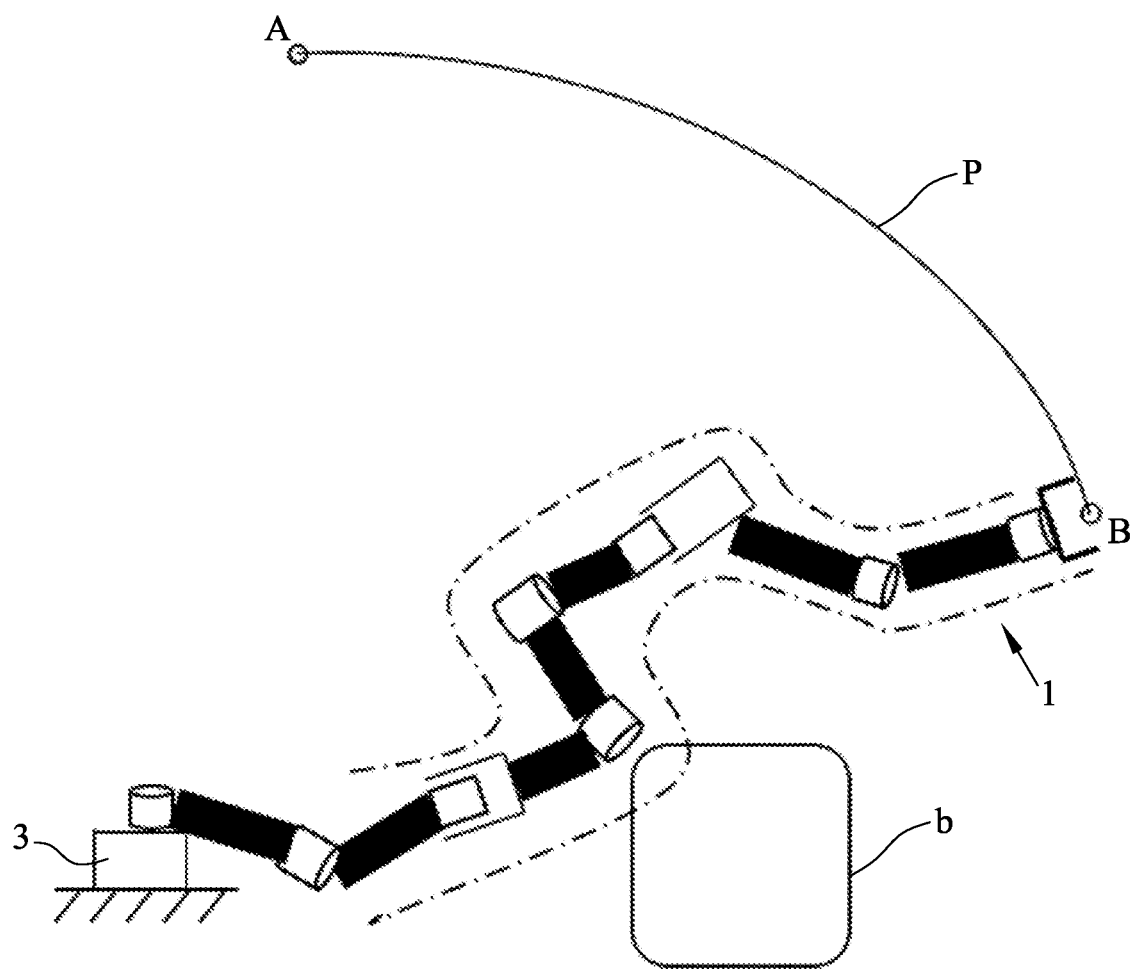
FIG. 8 is a schematic view of the robot arm moving along a movement path in the embodiment of the present invention.

The robot arm obstacle avoidance method of the present invention at least includes the following steps S101 to S105:

Refer to FIGS. 1, and 2, in step S101, modeling step: all the connecting arms 12 are constructed into cylinders with a fixed diameter, and the diameter of the cylinders is not less than the diameter of the thickest connecting arm. For example, if the diameter sizes of the plurality of connecting arms 12 of the robot arm 1 are 130 mm and 220 mm, respectively, the diameter and width of the modeled connecting arms 12 must be at least 220 mm or greater than 220 mm. This step is to simulate the robot arm 1 to estimate the distance under more severe conditions to avoid an obstacle b (as shown in FIG. 8). If the subsequent simulation result can smoothly avoid the obstacle b, it means that there will be sufficient buffer space between the robot arm 1 and the obstacle b when the robot arm 1 is in actual operation. That is to say, the present invention includes this modeling step to improve the reliability when in use.

Figure 4:
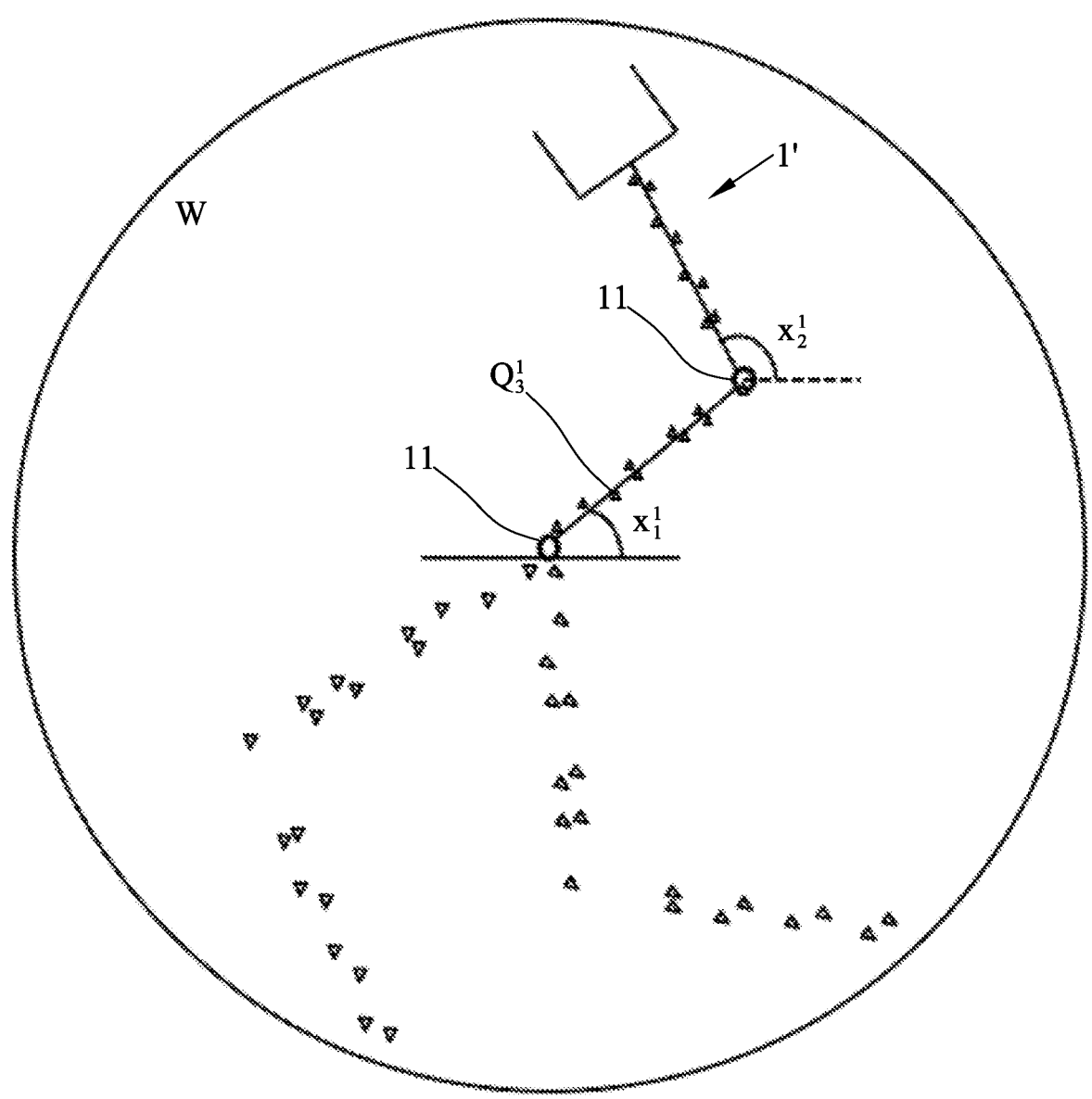
FIG. 4 is a schematic view of a robot arm in a working range of an embodiment of the robot arm obstacle avoidance system of the present invention.

Refer to FIGS. 1, 2, and 4, in step S102, collecting and evaluating coordinates step: collecting the k-th sampling point of the modeled robot arm 1 in the i-th working posture within a working range W, and labeling the corresponding evaluation coordinate position of the sampling point as $Q_k^i$, i and k are both positive integers. Different i values indicate different working postures of robotic arm 1. For example, $Q_3^1$ represents the evaluation coordinates of the third sampling point of robotic arm 1 in the first working posture. In FIG. 4, the sampling points are shown as triangle symbol and the sampling points have their own respective evaluation coordinates. After a certain number of sampling points are constructed, the corresponding relationship between the evaluation coordinates of the sampling points and the working posture of the robotic arm 1 can be established.

Figure 5:
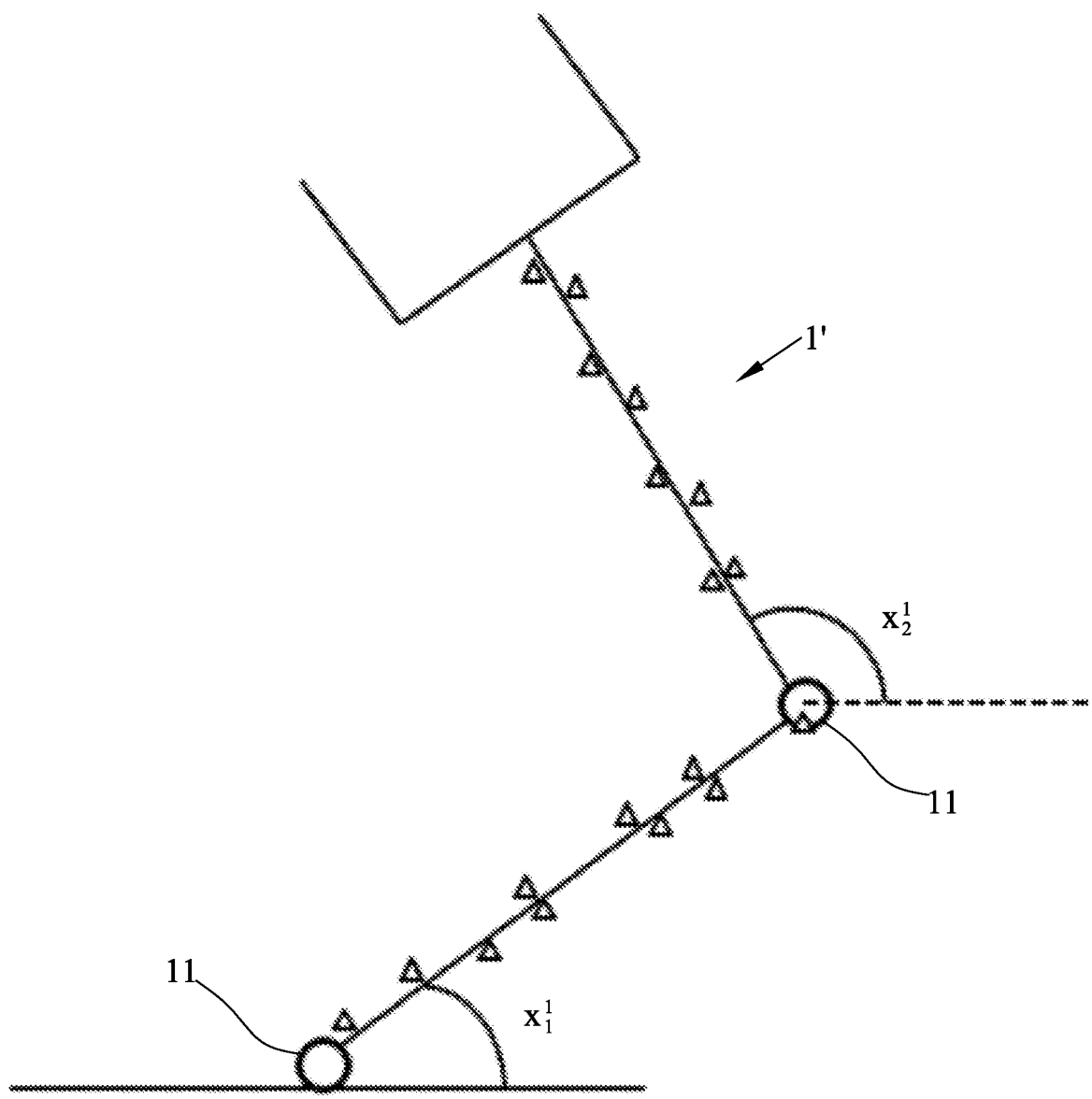
FIG. 5 is a schematic view of the robotic arm of the embodiment of the robotic arm obstacle avoidance system of the present invention, illustrating that the robot arm has only two joint degrees of freedom in the first working posture.
Figure 6:
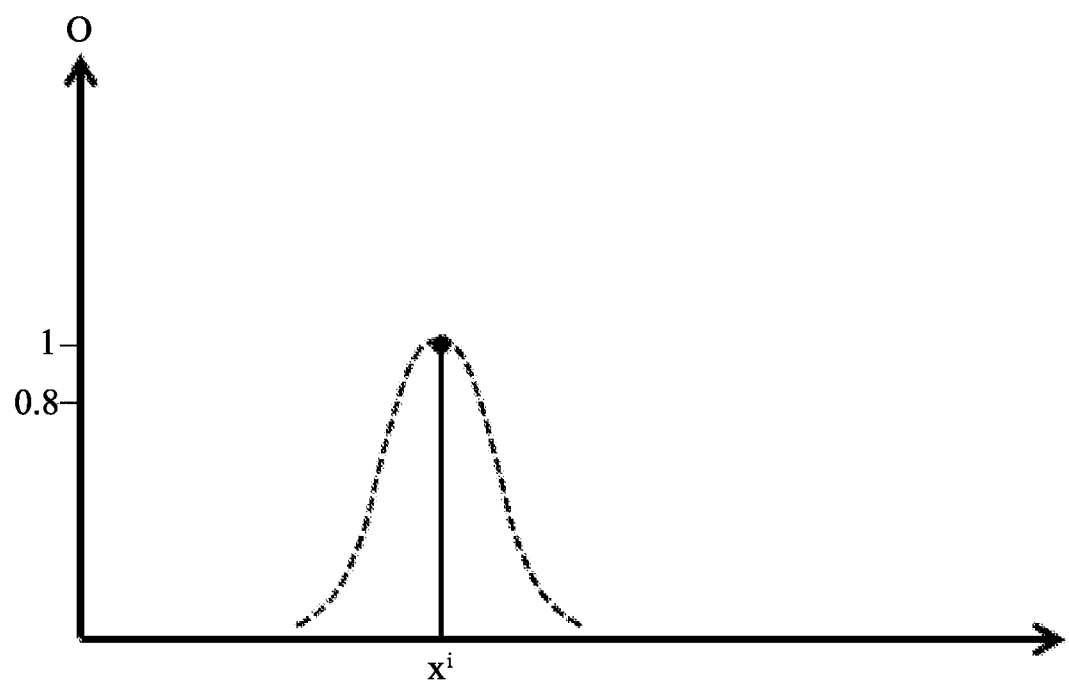
FIG. 6 is a distribution diagram of an occupancy function of the robot arm obstacle avoidance method of the present invention, wherein the horizontal axis has the control parameter $X^i$ of the i-th working posture, and the vertical axis is the function value of the occupancy function.
Figure 7:
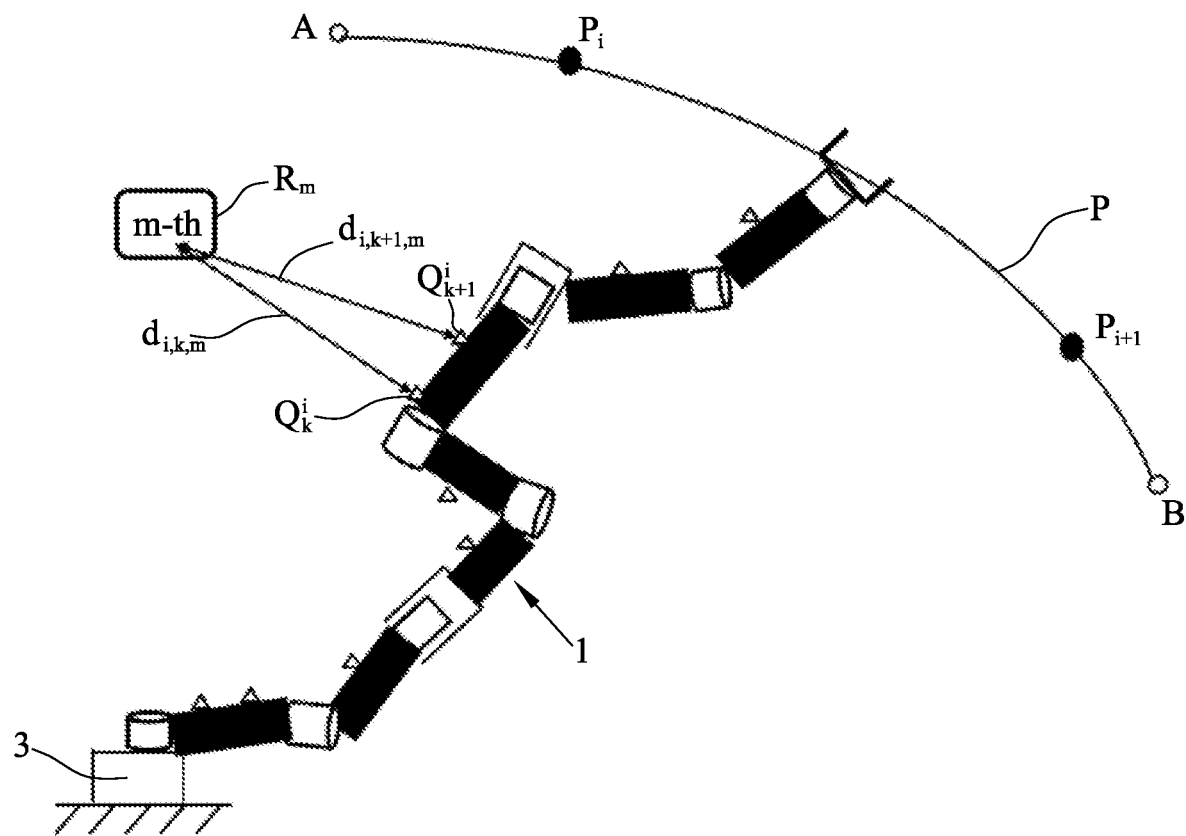
FIG. 7 is a schematic view of another robot arm of the embodiment of the robot arm obstacle avoidance system of the present invention in the i-th working posture, illustrating the distance between the k-th sampling point $Q_k^i$, of the robot arm in the i-th working posture and the m-th spatial coordinates $R_m$ as $d_{i,k,m}$.

Referring to FIGS. 1, 2, and 5, step S103, obtaining control parameter step: obtaining the control parameter $X^i$ corresponding to the i-th working posture of the robot arm 1 on the movement path P. The control parameter $X^i$ can be a control parameter $X^i$ set directly by the controller, or from a known working posture, and then using inverse kinematics to obtain the corresponding control parameter; that is to say, in step S103, how the control parameter $X^i$ came about is not restricted as long as the control parameter $X^i$ corresponding to the i-th working posture of the robot arm 1 on the movement path P.

The control parameter $X^i$ corresponding to the i-th working posture conforms to the following equation:

$$X^i = \Sigma_{j=1}^N x_j^i e_j \qquad (1)$$

Wherein N is a positive integer and represents the highest degree of freedom of the robot arm 1. This embodiment uses an eight-axis robotic arm 1 (as shown in FIG. 2), so N is 8, and $x_j$ represents the magnitude of the variation of the j-th joint 11, $e_j$ represents the j-th normal basis, j is a positive integer, and the control parameter $X^i$ can be made to cover the magnitude of the variation of the rotation or movement between the joints 11 through equation (1).

For the convenience and clarity of formula (1), FIG. 4 and FIG. 5 show a robot arm with two joints as an example, so as to further understand the obstacle avoidance operation of an eight-axis robot arm with a higher degree of freedom. FIG. 5 shows the first working posture of the robot arm 1'. The first working posture can be operated by directly setting the control parameter $X^1$, or the control parameter $X^1$ can be obtained from the first working posture according to inverse kinematics. The control parameter $X^1$, after being applied to equation (1), can be expressed as follows:

$$X1 = X^1 = x_1^1 e_1 + x_2^1 e_2$$

When the robot arm 1' has another working posture, its control parameter can be recorded as $X^2$, and so on; with the i-th working posture, the control parameter can be recorded as $X^i$.

Referring to FIGS. 1, 2, 6, and 7, step S104, establishing an occupation function step: an occupation function O is used to determine whether the m-th spatial coordinate within the working range of the robot arm 1 is part occupied by the robot arm 1, m is a positive integer, the m-th spatial coordinate can be marked as $R_m$, and the distance between $R_m$ and $Q_k^i$ can be represented by $d_{i,k,m}$, wherein $d_{i,k,m} = \|Q_k^i - R_m\|$.

The occupation function $O(X^i)$ is described as follows:

$$O(X^i) = \begin{cases} 0.5 < O_m \leq 1, & \text{if } \|Q_k^i - R_m\| \leq \varepsilon \; \forall k, \text{ then occupy} \\ 0 \leq O_m \leq 0.5, & \text{otherwise} \end{cases} \quad (2)$$

Formula (2) shows that when the distance between the m-th spatial coordinate $R_m$ and the evaluation coordinate $Q_k^i$ to be compared is less than a set value $\varepsilon$, and for all the k-th sampling points in the i-th working posture of the robot arm 1, the function value $O_m$ of the occupation function O corresponding to the occupied state is defined to range between 0.5 and 1, and the function value $O_m$ of the occupation function O corresponding to the non-occupied state is defined to range from 0 to 0.5, wherein $\varepsilon$ is a real number. For example, if the m-th spatial coordinate $R_m$ in the space is occupied by an obstacle, and when the occupation function $O(X^i)$ is calculated to be 1, the spatial coordinates $R_m$ will be substantially occupied by the evaluation coordinates because the function value $O_m$ of the occupation function is greater than 0.5 and less than 1. Also, because the evaluation coordinates are the k-th sampling point of the robot arm 1 in the i-th working posture, the i-th working posture of the robot arm will be evaluated as will-touch obstacles. When the occupation function $O(X^i)$ is calculated to be 0, the spatial coordinates $R_m$ will not be substantially occupied by the evaluation coordinates because the function value $O_m$ of the occupation function is greater than 0 and less than 0.5. And the i-th working posture of the robot arm will be evaluated as will-not-touch obstacles. Preferably, in the establishing an occupation function step, in order to have the best numerical solution for the robot arm in the subsequent obstacle avoidance movement path, the occupation function $O(X^i)$ needs to be further converted into a Gaussian function, which has a curve shown as the dashed line in FIG. 6.

It should be particularly noted that step S104 does not have to be after step S103. Specifically, step S103 may be executed first and then step S104 is executed, or steps S103 and S104 may be executed at the same time.

Referring to FIG. 1, step S105, finding an obstacle avoidance posture step: according to the following equation to obtain the obstacle avoidance posture, $$\text{Min}(X_{new}^i - X^i)^2 \text{ s.t. } O(X_{new}^i) \leq O_T \quad (3)$$

Wherein $X_{new}^i$ is the control parameter corresponding to the obstacle avoidance posture. In addition, since the control parameter $X^i$ can be, for example, the amount of change that each joint is regulated by the respective motor. Therefore, through the minimization problem of equation (3), to make the required adjustment amount of change of each motor the smallest, an obstacle avoidance posture satisfying equation (3) can be obtained. By definition, when the function value $O_m$ of the occupancy function $O(X^i)$ is $0.5 < O_m \leq 1$, it means that the robot arm is evaluated as will-touch an obstacle, and when the function value $O_m$ of the occupancy function $O(X^i)$ is $0 \leq O\_m \leq 0.5$, it means that the robot arm is evaluated as will-not-touch the obstacle. Therefore, the present invention can also adjust the threshold $O_T$ from 0.5 to another threshold $O_T'$ less than 0.5, such as $O_T' = 0.4$, to improve the safety level of obstacle avoidance. As such, the calculated occupancy function value $O_m$ must be less than or equal to 0.4, and the obstacle avoidance posture of the robot arm will be evaluated as will-not-touch the obstacle, and when the calculated occupancy function value $O_m$ is greater than 0.4, the obstacle avoidance posture of the robot arm will be evaluated as will-touch the obstacle. As the occupancy function value $O_m$ becomes larger, the more serious the collision, i.e. the will-touch the obstacle, will be. It can be seen from the above that the condition wherein the adjusted threshold $O_T'$ is even smaller than the threshold $O_T$, means that, in actual use, the distance between the robot arm and the obstacle is increased to reduce the probability of the robot arm touching the obstacle. Therefore, the safety level of obstacle avoidance can be controlled by adjusting the size of the threshold $O_T$.

In actual applications, for example, when the robot arm performs dispensing operations along a specific path on a horizontal surface, the end of the robot arm used for dispensing must be maintained on the horizontal surface. Therefore, under the condition that the equation (3) is met, an additional restriction can be added wherein the relative position between the base and the eighth joint of the robot arm in sequence disposed outwards from the base must stay the same before and after the step of finding an obstacle avoidance posture, so as to ensure that the robot arm can maintain the correct position of the end effector when performing tasks while avoiding obstacles. Moreover, it is also possible to add a constraint that the end vector remains unchanged, that is, the posture of the end effector of the robot arm itself in the world coordinate system does not change with time, so that the robot arm can be applied to the hole position operation that requires accurate alignment (no inclination in the hole entry direction), such as, screwing operations or edge-finding operations on target items.

Referring to FIGS. 2, 3, 8, and 9, the following will use the above-mentioned obstacle avoidance method to avoid an obstacle b by the robot arm 1, so as to understand the advantages of the present invention:

First, store the data obtained in step S101 to step S104 in the database 21 of the host computer 2, and then install related drivers in the robot arm 1 and the host computer 2. The time required to execute steps S101 to S104 in the present invention is the number of evaluation coordinates multiplied by the number of sampled postures and then multiplied by the calculation time of each group of the permutation and combination of the postures when occupying the evaluation coordinates. Preferably, the time required to execute steps S101 to S104 is completed in one day.

Figure 9:
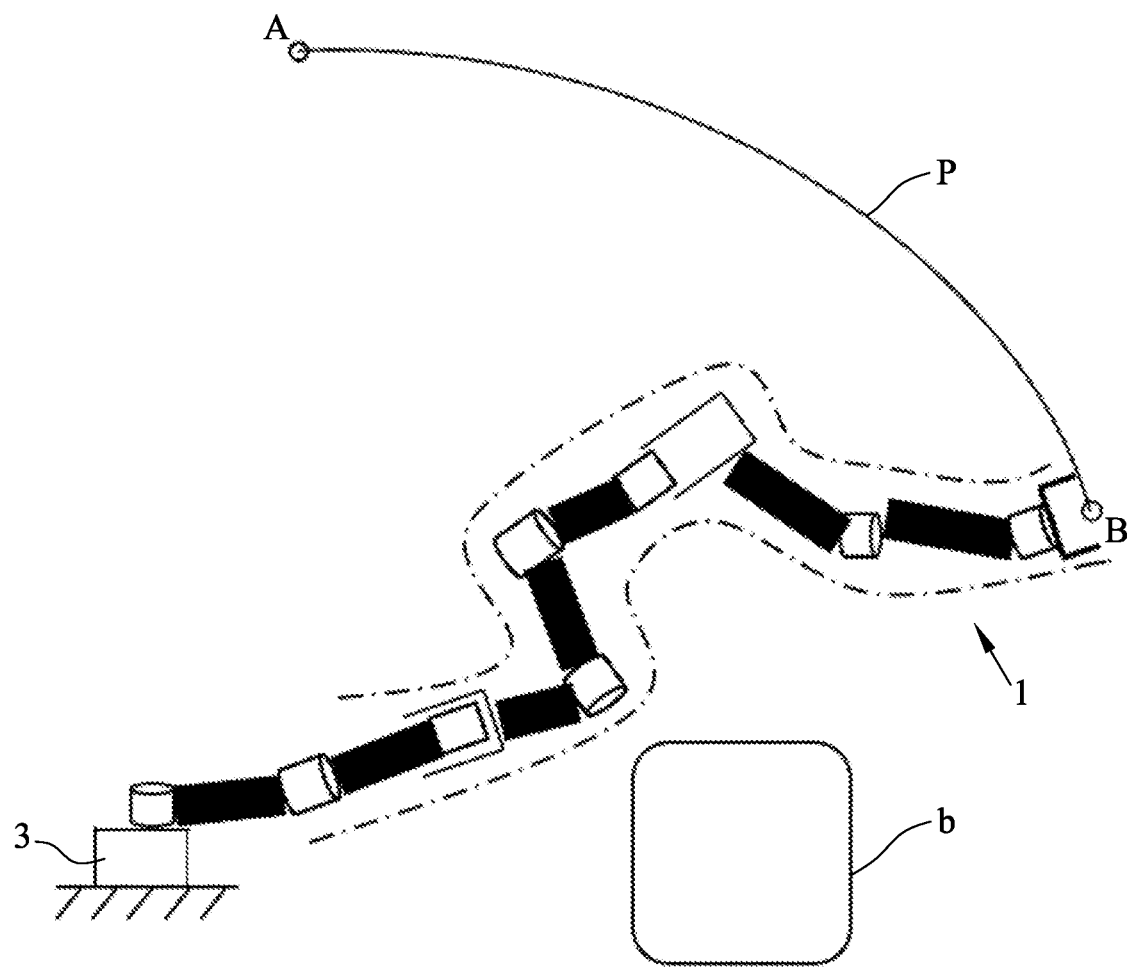
FIG. 9 is a schematic view similar to FIG. 8 illustrating that the robot arm of the present invention is controlled to avoid obstacles in an obstacle avoidance posture.

Then, when the robot arm 1 is performing a task, the computation control module 22 controls the robot arm 1 to move along a movement path P. There is a plurality of path coordinates on the movement path P, and each path coordinate can match the corresponding evaluation coordinate. When there is an obstacle b within the working range of the robot arm 1 (the relevant coordinates of the obstacle can be obtained through 3D point cloud technology, for example), the computation control module 22 will calculate whether the robot arm 1 will collide with the obstacle b. This calculation process can be completed within 10 milliseconds. If this calculation process evaluates that there will be no collision, the robot arm 1 continues to move along the movement path P. On the contrary, if it is evaluated that a collision will occur (as shown in FIG. 8), the computation control module 22 will perform the finding an obstacle avoidance posture step, so that the robot arm 1 can continue to perform the task by passing the obstacle b in the obstacle avoidance posture (as shown in FIG. 9). For example, the time required to perform the step of finding an obstacle avoidance posture can be the following equation:

$$t=D*(E*F+G) \quad (4)$$

Wherein t refers to the time required for the step of finding an obstacle avoidance posture, D is the number of iterations, E is the number of calculations of the occupation function required for each iteration, F is the time required for each calculation of the occupation function, and G is the required time applicable to the algorithm of equation (4).

If, the computation control module 22 evaluates that a collision will occur, but when the time to execute the finding an obstacle avoidance posture step exceeds a running time, the computation control module 22 will control the robot arm 1 to stop and wait for the obstacle b to move away. After the obstacle b moves away from the position where the collision may occur, the computation control module 22 controls the robot arm 1 to continue to perform the task.

The present invention pre-stores the relevant parameters that the robot arm may encounter in the task execution in the database, so that the robot arm system can quickly evaluate whether the robot arm will collide during the movement when used. If it is evaluated that a collision will occur, the robot arm obstacle avoidance method of the present invention has pre-calculated all the possible working postures that will collide with the obstacle, so the present invention only needs to calculate the working posture for avoiding the obstacle that will collide with the obstacle, and can quickly find a proper obstacle avoidance posture to avoid obstacles. As such, the robot arm of the present invention will not be interrupted due to encountering obstacles when performing tasks.

In summary, the robot arm obstacle avoidance method of the present invention and the robot arm obstacle avoidance system using the obstacle avoidance method can indeed achieve the purpose of the invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A robot arm obstacle avoidance method, applicable to a robot arm with a plurality of joints and a plurality of connecting arms respectively connected to different joints, the robot arm obstacle avoidance method comprising:
   a modeling step, to construct the connecting arms into a cylinder with a fixed diameter, and the diameter of the cylinder being not less than the diameter of the thickest connecting arm;
   a collecting and evaluating coordinates step, to collect a k-th sampling point of a modeled robot arm in an i-th working posture within a working range, and mark an evaluation coordinate corresponding to the sampling point as $Q_k^i$, both i and k being positive integers;
   an establishing an occupancy function step, to establish an occupancy function O to be used to determine whether an m-th spatial coordinate is part of the occupancy function O occupied by the robot arm, m being a positive integer; when the distance between the m-th spatial coordinate and the evaluation coordinate to be compared is less than a set value, defining a function value range of the occupation function O corresponding to an occupied state to be greater than 0.5 and less than 1, and defining the function value range of the occupation function O corresponding to a non-occupied state to be 0 to 0.5;
   an obtaining control parameter step, to obtain a control parameter $X^i$ corresponding to the i-th working posture of the robot arm on a movement path; and
   a finding an obstacle avoiding posture step, based on the following equation:

$$\text{Min}(X_{new}^i - X^i)^2 \text{ s.t. } O(X_{new}^i) \leq O_T,$$

to obtain an obstacle avoidance posture, where $X_{new}^i$ is the control parameter corresponding to the obstacle avoidance posture, $O(X_{new}^i)$ is an occupation function value corresponding to the control parameter $X_{new}^i$, and $O_T$ is a threshold.

2. The robot arm obstacle avoidance method according to claim 1, wherein the finding an obstacle avoidance posture step further comprises a step of adjusting the threshold $O_T$ to another threshold $O_T'$, and the adjusted threshold $O_T'$ is less than the threshold $O_T$, and the threshold $O_T'$ is less than 0.5.

3. The robot arm obstacle avoidance method according to claim 1, wherein the robot arm further comprises an end effector, and a posture of the end effector in a world coordinate system does not change with time.

4. The robot arm obstacle avoidance method according to claim 3, wherein when the time required for the step of finding an obstacle avoidance posture is greater than a running time, the robot arm stops moving.

5. The robot arm obstacle avoidance method according to claim 1, wherein data obtained in the modeling step, the collecting and evaluating coordinates step, the obtaining control parameter step, and the establishing an occupation function step are all pre-stored in a database.

6. The robot arm obstacle avoidance method according to claim 5, wherein when the time required for the step of finding an obstacle avoidance posture is greater than a running time, the robot arm stops moving.

7. A robot arm obstacle avoidance system, comprising:
   a robot arm, fixed to a base, comprising a plurality of joints and a plurality of connecting arms respectively connected to different joints; and
   a host, electrically connected to the robot arm and comprising:
      a computation control module used to execute the robot arm obstacle avoidance method according to claim 1; and
      a database, electrically connected to the computation control module for storing data obtained in the modeling step, the collecting and evaluating coordinates step, the obtaining control parameter step, and the establishing an occupancy function step according to claim 1.

8. The robot arm obstacle avoidance system according to claim 7, wherein the robot arm further comprises an end effector, and a posture of the end effector in a world coordinate system does not change with time.

9. The robot arm obstacle avoidance system according to claim 7, wherein when the time required for the step of finding an obstacle avoidance posture is greater than a running time, the robot arm stops moving.

10. The robot arm obstacle avoidance system according to claim 7, wherein the finding an obstacle avoidance posture step further comprises a step of adjusting the threshold $O_T$ to another threshold $O_T'$, and the adjusted threshold $O_T'$ is less than the threshold $O_T$, and the threshold $O_T'$ is less than 0.5.

\* \* \* \* \*